US011677846B1

(12) United States Patent
Howes et al.

(10) Patent No.: US 11,677,846 B1
(45) Date of Patent: Jun. 13, 2023

(54) PRIVACY-PRESERVING FIRST-PARTY TRACKING

(71) Applicant: Snap Inc., Santa Monica, CA (US)

(72) Inventors: Winston Howes, Marina del Rey, CA (US); Sharada Sundaram, Palo Alto, CA (US); Marcel M. Yung, New York, NY (US); Bennet Yee, Mountain View, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/528,358

(22) Filed: Jul. 31, 2019

Related U.S. Application Data

(60) Provisional application No. 62/712,745, filed on Jul. 31, 2018.

(51) Int. Cl.
*H04L 67/50* (2022.01)
*H04L 9/40* (2022.01)
*G06Q 30/0251* (2023.01)
*H04L 51/046* (2022.01)

(52) U.S. Cl.
CPC ....... *H04L 67/535* (2022.05); *G06Q 30/0255* (2013.01); *H04L 51/046* (2013.01); *H04L 63/0428* (2013.01)

(58) Field of Classification Search
CPC ... H04L 67/22; H04L 51/046; H04L 63/0428; G06Q 30/0255
USPC ......................................................... 709/224
See application file for complete search history.

(56) References Cited

U.S. PATENT DOCUMENTS

| 8,805,987 | B1 * | 8/2014 | Kirkham | H04L 67/02 |
| | | | | 709/223 |
| 9,003,012 | B2 * | 4/2015 | Balasubramanian | ... H04L 67/02 |
| | | | | 709/224 |
| 9,955,297 | B2 * | 4/2018 | Kostka | H04W 88/08 |
| 2006/0168645 | A1 * | 7/2006 | Song | G06F 16/958 |
| | | | | 726/3 |
| 2013/0185643 | A1 * | 7/2013 | Greifeneder | H04L 67/22 |
| | | | | 715/736 |
| 2013/0246563 | A1 * | 9/2013 | Cardozo | G06F 16/955 |
| | | | | 709/217 |
| 2014/0133656 | A1 * | 5/2014 | Wurster | H04W 4/023 |
| | | | | 380/270 |
| 2017/0013450 | A1 * | 1/2017 | Ziv | H04W 12/001 |

FOREIGN PATENT DOCUMENTS

WO   WO-0239288 A1 *   5/2002   ........... G06F 16/954

* cited by examiner

*Primary Examiner* — Mohamed A. Wasel
*Assistant Examiner* — John Fan
(74) *Attorney, Agent, or Firm* — Schwegman Lundberg & Woessner, P.A.

(57) ABSTRACT

A tracking system is provided that tracks user browsing activity while maintaining user privacy. It is determined whether a cookie is stored in local storage of a client device. If the cookie is not stored: a tracking identification (ID) is generated; the tracking ID, a cookie rotation timestamp, and a failed request counter in a generated cookie is stored; and the generated cookie is copied and attached to a transmitted event. If the cookie is stored: it is determined whether a time indicated by a stored cookie rotation timestamp is in the past; if the time is in the past, a flag requesting a new cookie value is set for a transmitted event; and if the time is not in the past, the stored cookie is copied and attached to a transmitted event.

17 Claims, 14 Drawing Sheets

PRIVACY-PRESERVING FIRST-PARTY TRACKING

CROSS REFERENCE TO RELATED APPLICATIONS

This application claims priority to U.S. Provisional Application No. 62/712,745, filed Jul. 31, 2018 and entitled "PRIVACY-PRESERVING FIRST-PARTY TRACKING." The contents of this prior application is considered part of this application, and is hereby incorporated by reference in its entirety.

TECHNICAL FIELD

Embodiments of the present disclosure relate generally to computing technology and, more particularly to privacy sensitive systems for tracking browsing events.

BACKGROUND

It is common for advertisers to use conversion pixels to track events (e.g. purchase or sign-up) on websites and mobile sites. This enables them to measure and understand how much such events cost in terms of ad spend, and enables sophisticated targeting (e.g. "let's reach out again to people who signed up but didn't buy").

BRIEF DESCRIPTION OF THE SEVERAL VIEWS OF THE DRAWINGS

The appended drawings merely illustrate example embodiments of the present disclosure and should not be considered as limiting its scope.

DETAILED DESCRIPTION

Embodiments of the present disclosure relate generally to privacy sensitive tracking systems for tracking browsing events. In one aspect, a first party cookie is generated and stored while preserving user privacy, so as to track browser visits to the same server site's sub-domains by a first party server. Using cookies allows for the identification of unique users across browsing sessions. According to the embodiments disclosed herein, the browser visits are tracked such that an adversary monitoring the communications is unable to track a user consistently (e.g., link various instances of browser visits).

In one aspect, the tracking system may include any instrumentality or aggregate of instrumentalities operable to compute, process, store, display, generate, communicate, or apply various forms of data for tracking browsing events. For example, the tracking system may be or include a group of one or more server machines configured to maintain a unique identifier (ID) for each browser. In one aspect, after certain time intervals, the one or more servers encrypt the unique ID (and optionally other parameters) and save the encrypted unique ID in a first party cookie on a client device. In one aspect, each encrypted blob has a unique counter that is used to change cookie value periodically.

By virtue of the tracking systems disclosed herein, it is possible to perform deterministic linking of user identities across subdomains, while avoiding the introduction of overhead and latency on advertising websites. In addition, it is possible to prevent an adversary (e.g., eavesdropper) from tracking user interactions over a period of time.

Figure 1:
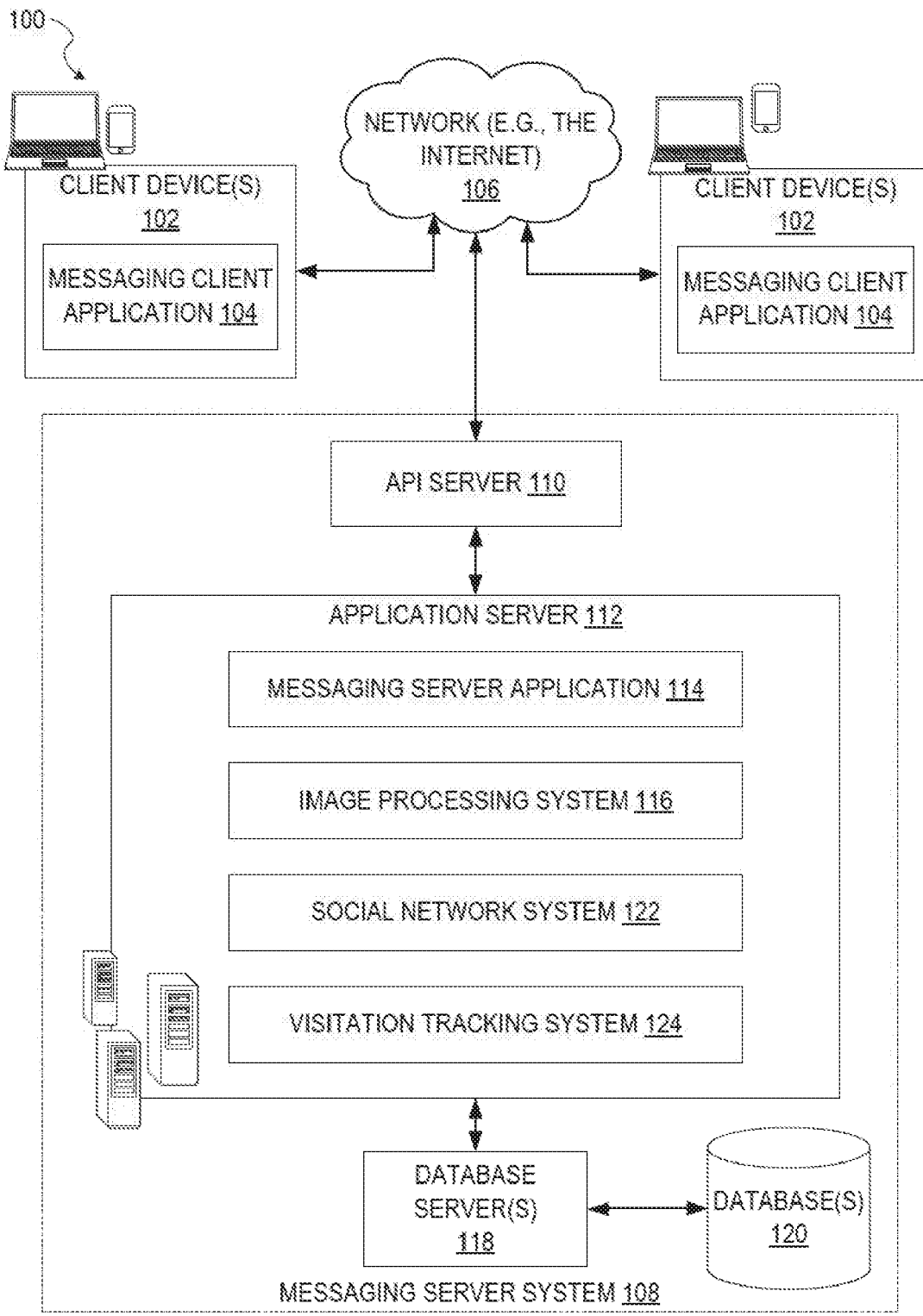
FIG. 1 is a block diagram showing an example messaging system for exchanging data (e.g., messages and associated content) over a network in accordance with some embodiments, wherein the messaging system includes a visitation tracking system.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions commands to invoke functions) as well as payload data (e.g., text, audio, video or other multimedia data).

The messaging server system 108 provides server-side, functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a visitation tracking system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
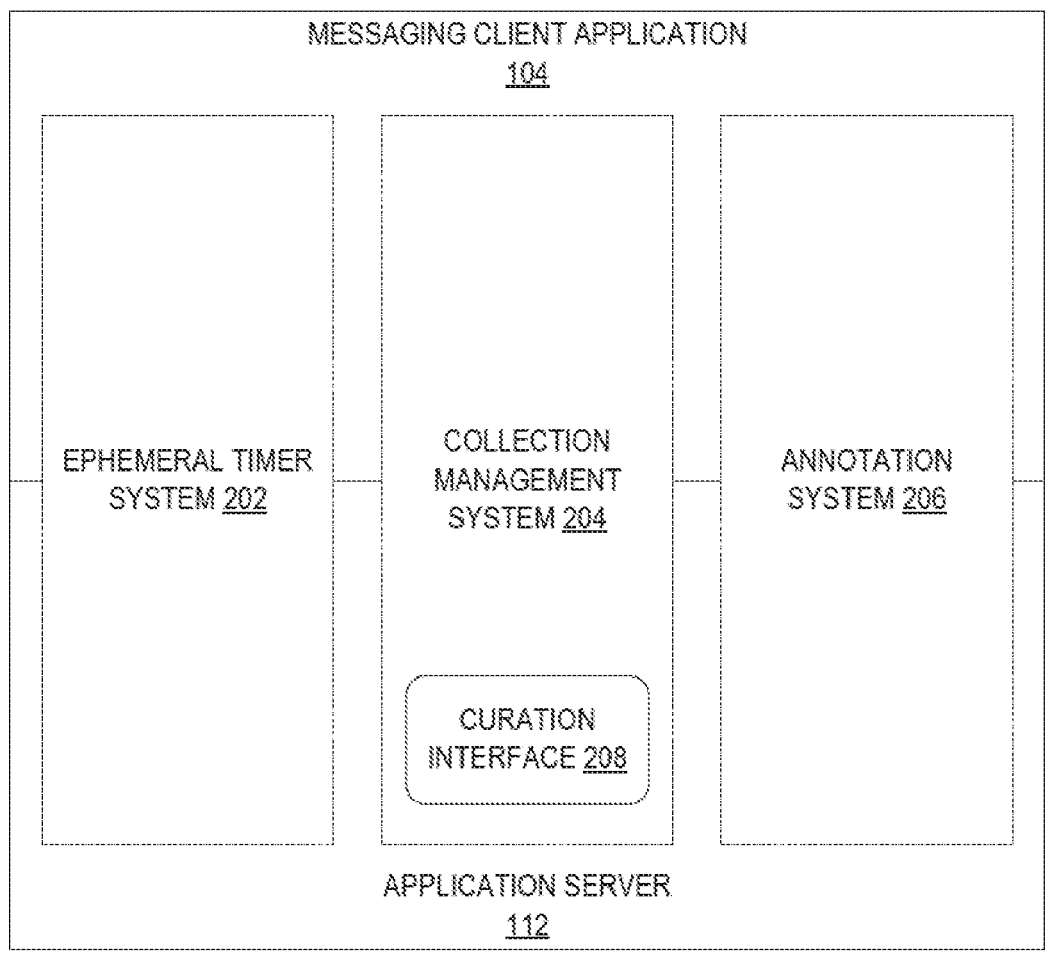
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
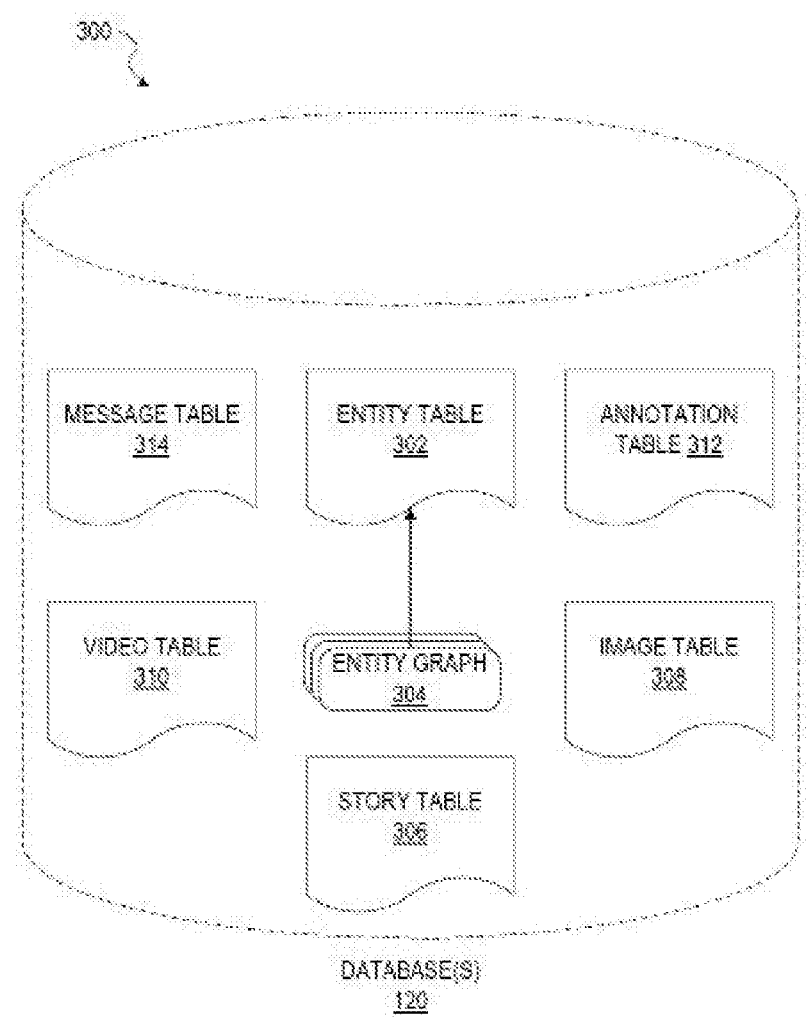
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
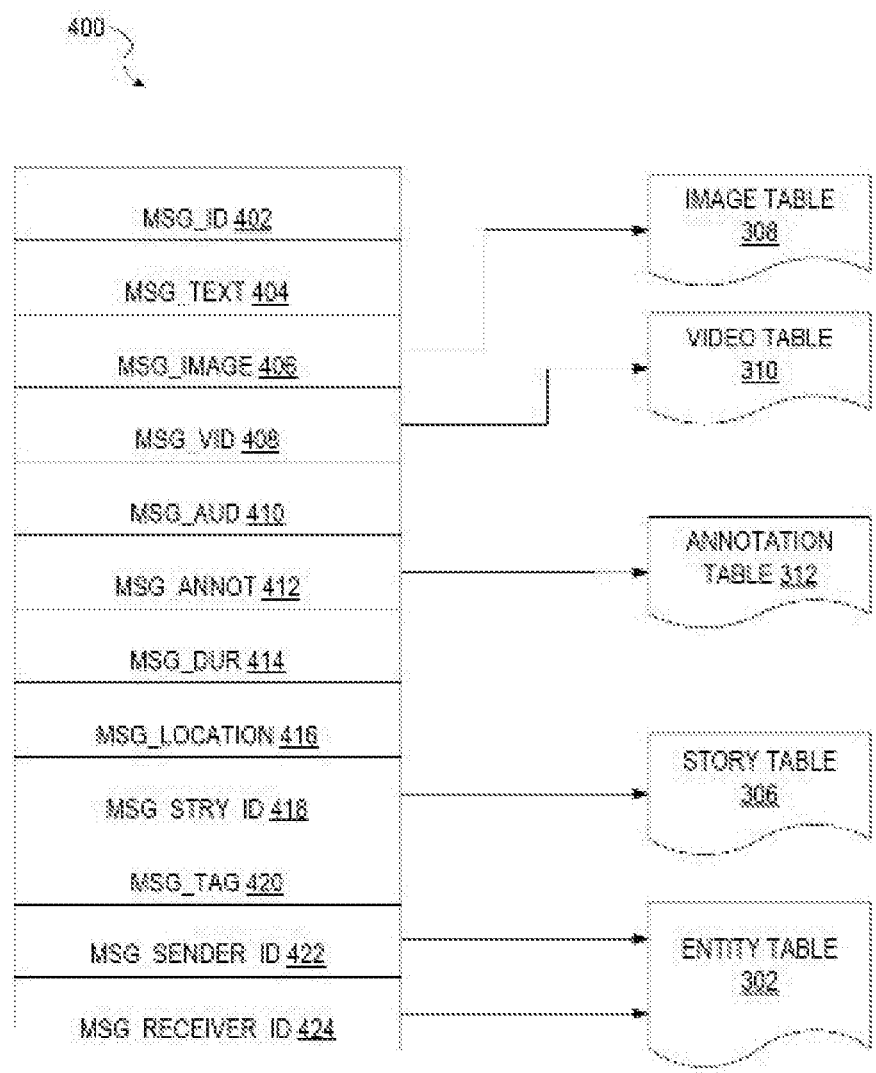
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
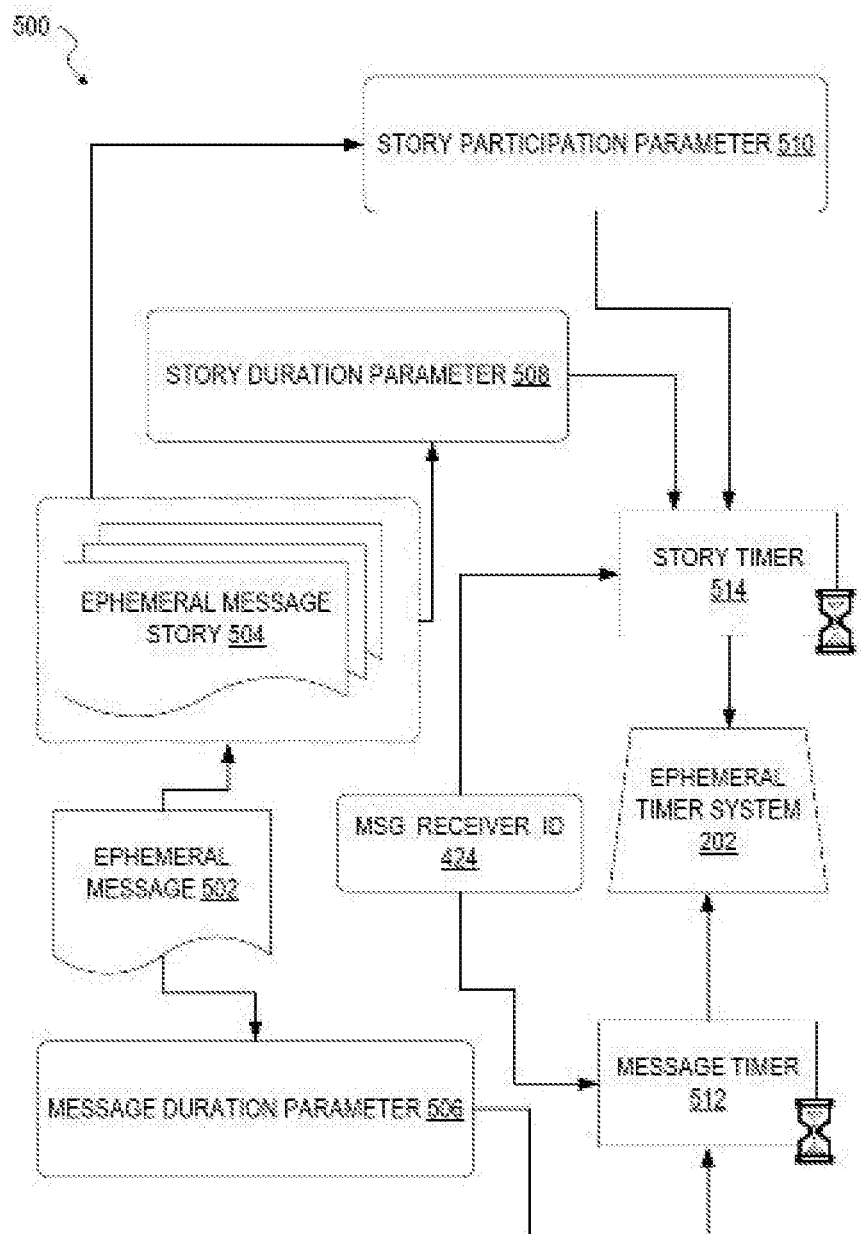
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
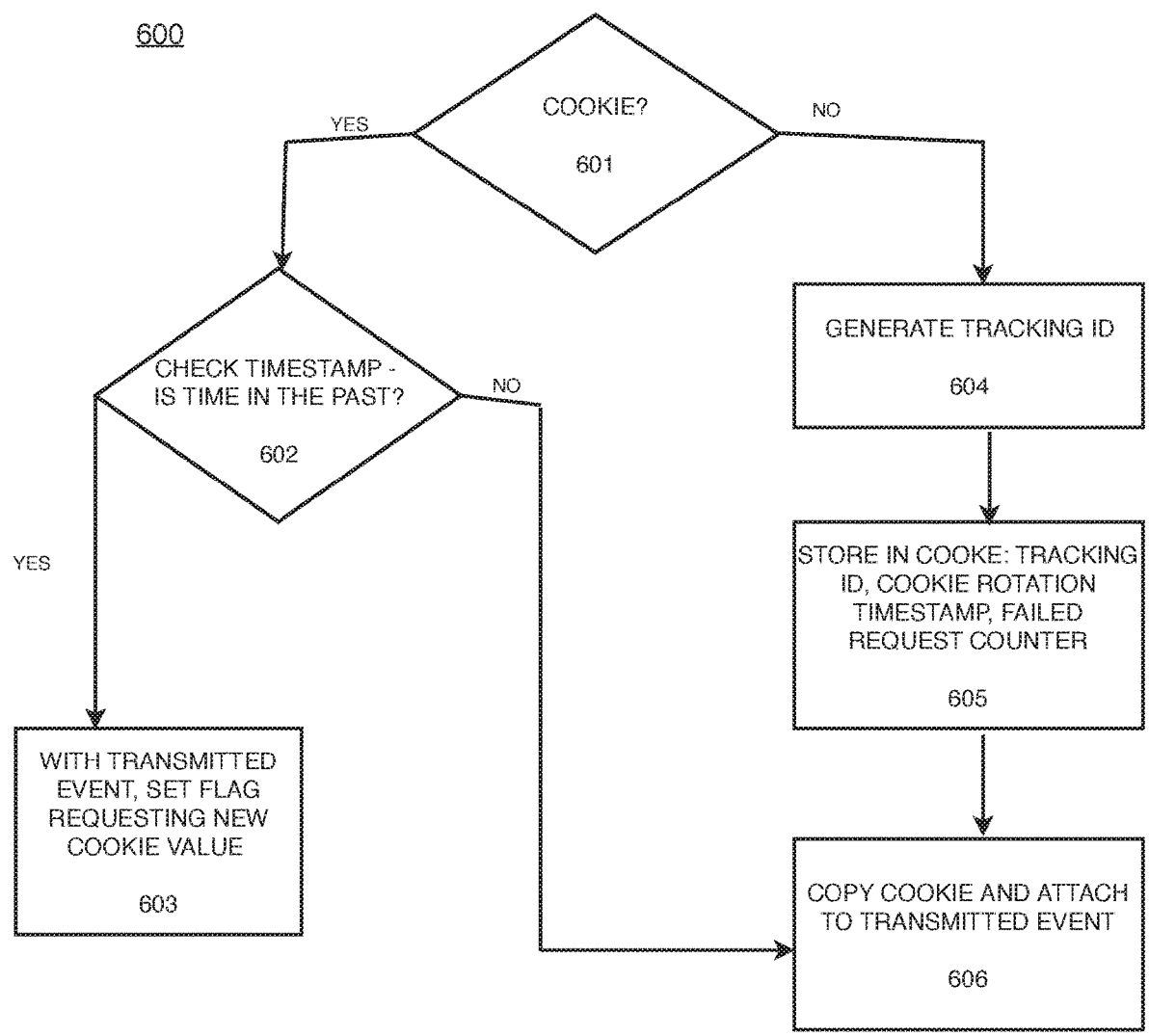
FIG. 6 is a flowchart illustrating operations of JavaScript running on an advertiser's website performing a method for tracking user browsing according to a first example embodiment.
Figure 7:
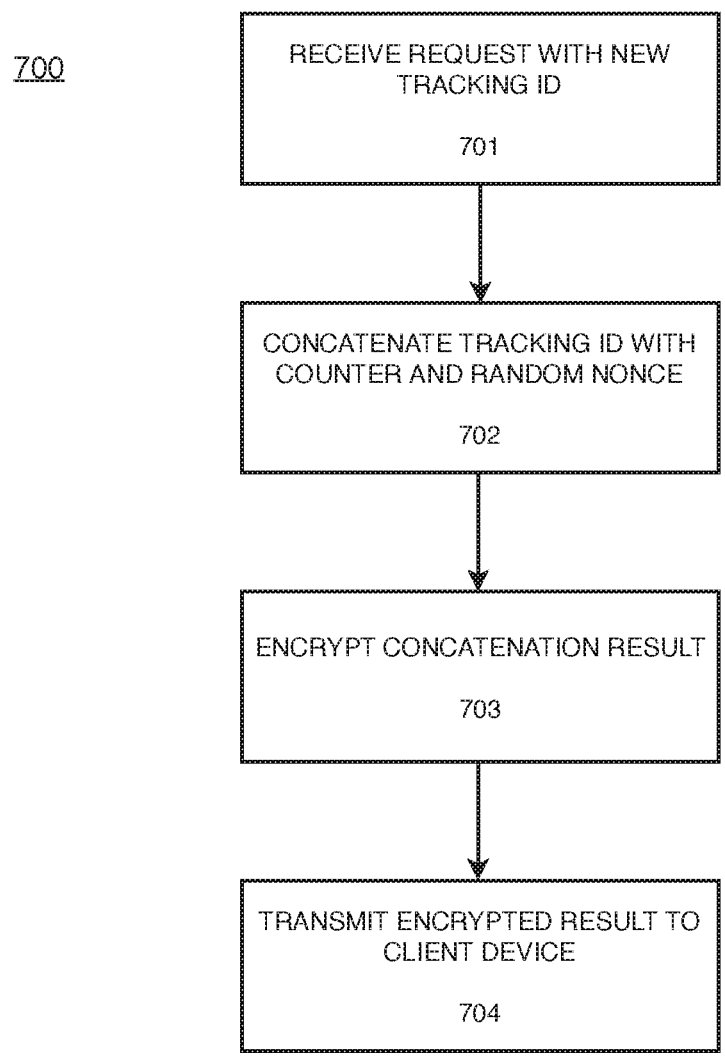
FIG. 7 is a flowchart illustrating operations of a tracking system receiving a new tracking ID according to a first example embodiment.
Figure 8:
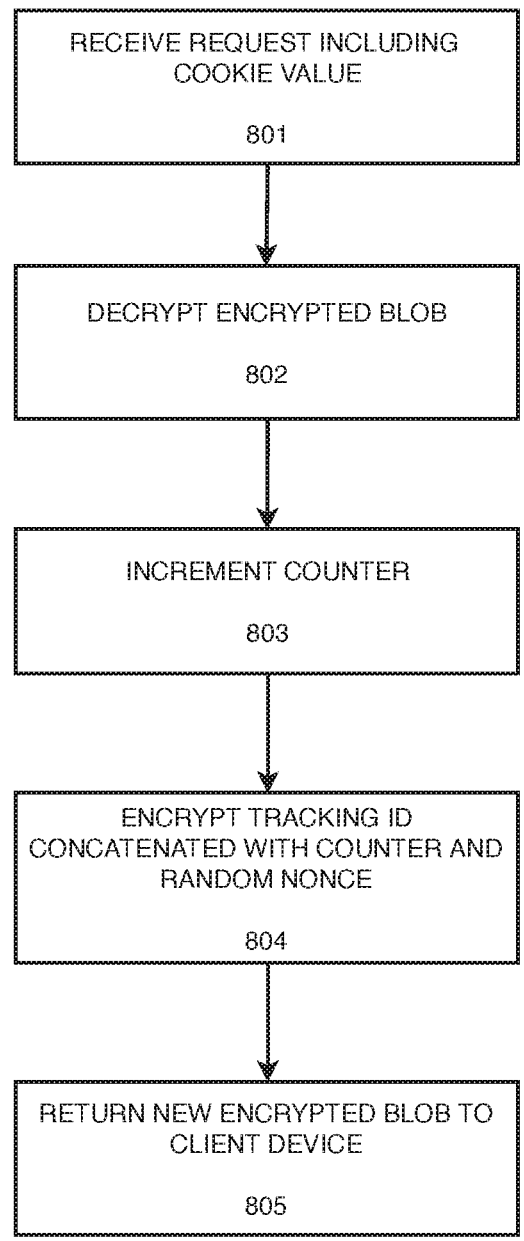
FIG. 8 is a flowchart illustrating operations of a tracking system receiving an encrypted blob according to a first example embodiment.

A first embodiment will now be discussed in connection with FIG. 6-8. In the first embodiment, encryption is performed by the server system (e.g., messaging server system 108). Here, an adversary (e.g., potential attacker) is considered that repeats messages either before a legitimate party sends them or in parallel (e.g., a "rushing" adversary). Generally, an advertising website generates its initial tracking ID if no cookie exists. The advertising website places the tracking ID in a site-wide insecure cookie (scoped to the highest level domain) along with a timestamp (indicating a timing at which to update the cookie value) and a failed requests counter. The tracking ID may be placed in the insecure cookie by, for example, JavaScript running on the advertising website. When an event (e.g., site registration, purchase, etc.) is transmitted to the server, the JavaScript causes the tracking ID to be copied from the cookie and attached to the event. In one aspect, if the event is transmitted at a time later than the time indicated by the timestamp included in the cookie, a flag is added to the event and the server responds with an encrypted blob containing the original tracking ID, a counter, and a random nonce. The counter is incremented in response to each update to the cookie value. In one aspect, the cookie value is updated in response to each page load and an unpredictable sequence of cipher texts is provided with the random nonces, such that an attacker is prevented from tracking a user with the cookie.

In one aspect, the JavaScript running on the advertising website causes the failed request counter to be incremented in response to each failed request to the server asking for a new encrypted blob. Once the failed request counter passes a threshold, the JavaScript deletes the cookie. In this way, it is possible to preserve the user's privacy in situations where an adversary blocks requests to the server.

According to the first embodiment, the client device simply requests encrypted blobs, stores the encrypted blob in its cookie, and sends the encrypted blob with events. The server, when prompted, decrypts the encrypted blob, increments the counter value, encrypts the tracking ID concatenated with the new counter value and a random nonce, and returns the new encrypted blob.

In the context of this first embodiment, there are 4 situations to consider. The first situation considers a user's first time viewing a site. The second situation is a situation in which the user views a site with a valid timestamp. The third situation is a situation in which the user views a site with an expired timestamp. The fourth situation is a situation in which the user views a site on a different subdomain (e.g., a related site).

Turning now to the first situation, in response to a user viewing site, the JavaScript running on the advertising website checks for the existence of an insecure cookie (601) according to method 600. Since in the first situation it is a user's first time viewing a site, the insecure cookie does not exist ("NO" at 601).

The JavaScript generates a random value which will function as the tracking ID (604). The JavaScript stores the tracking ID, a cookie rotation timestamp, and a failed request counter in an insecure cookie scoped to the top level domain (605).

In one aspect, the cookie rotation timestamp indicates that on any event after the timestamp, the JavaScript should set a flag indicating that the server should generate and return a new cookie value.

In a situation where the JavaScript gets the new cookie value, it stories it in the insecure cookie and updates the cookie rotation timestamp. In one aspect, the timestamp is rounded to a certain level of specificity (e.g., an hour or day) so as to prevent an adversary from tracking a user based on granular timestamps.

As previously discussed, the failed request counter is incremented in response to each failed request to the server asking for a new encrypted blob. In one aspect, if the JavaScript sees a number of failed requests to fetch a new cookie value, it causes the cookie to be destroyed (deleted) and initiation of a tracking process to protect user privacy. In one aspect, the failed request counter is optionally paired with a second timestamp indicating the last time the tracking system saw a failed request, in order to manage (e.g., limit) how frequently the failed requests counter is updated.

In one aspect, the JavaScript optionally retrieves N encrypted blobs from the server, each decrypting to a tracking ID concatenated with an incremented counter and a random nonce. The JavaScript caches these encrypted blobs in local storage and replaces the current cookie value with one of them in the event that the number of failed requests crossed a certain threshold according to the failed request counter.

In one aspect, in a case where the JavaScript causes an event to be transmitted to the server, the JavaScript causes the cookie value to be copied and attached to the event (606).

Now turning to the second situation, in response to a user viewing a site, the JavaScript checks for the existence of an insecure cookie (601). Since in the second situation the user is viewing a site with a valid timestamp, the insecure cookie does exist ("YES" at 601).

The JavaScript checks the timestamp included in the cookie and checks if the indicated time is in the past (602). Since in the second situation the user is viewing a site with a valid timestamp, the time indicated by the timestamp is not in the past ("NO" at 602).

In the case where the JavaScript causes an event to be being transmitted to the server, the JavaScript causes cookie value to be copied and attached to the event (606).

Now turning to the third situation in which the user views a site with an expired timestamp. In response to a user viewing a site, the JavaScript checks for the existence of an insecure cookie (601). Since in the third situation the user is viewing a site with an expired timestamp, the insecure cookie does exist ("YES" at 601).

The JavaScript checks the timestamp included in the cookie and checks if the indicated time is in the past (602). Since in the third situation the user is viewing a site with an expired timestamp, the time indicated by the timestamp is in the past ("YES" at 602).

In a case where the JavaScript causes an event to be transmitted to the server, the JavaScript causes a flag to be set indicating that the server should generate and return a new cookie value (603).

The server receives and analyzes the cookie value. As illustrated by method 700 of FIG. 7, if the server determines that is has received a request including a new tracking ID (701), it concatenates the tracking ID with a counter set to 0 and a random nonce (702), encrypts the result (703) and returns it to the client device (704). As illustrated by method 800 of FIG. 8, the server receives a request including a cookie value (801) and if the request includes an encrypted blob, it decrypts the encrypted blob (802), increments the counter (803), encrypts the tracking ID concatenated with the counter and a random nonce (804), and returns the newly encrypted blob to the client device (805).

In the case where the JavaScript causes an event to be transmitted to the server, the JavaScript causes the cookie value to be copied and attached to the event (606).

Now turning to the fourth situation in which the user views a site on a different subdomain (e.g., a related site). In response to a user viewing a site, the JavaScript checks for the existence of an insecure cookie (601). Since in the fourth situation the user is viewing a related site, the insecure cookie does exist ("YES" at 601).

The JavaScript checks the timestamp included in the cookie and checks if the indicated time is in the past (602). Depending on the timestamp value, the fourth situation is handled in the same way as the second or third situations. For example, if the time indicated by the timestamp is not in the past ("NO" at 602), the fourth situation is handled in the same manner as the second situation (e.g., the flow continues to operation 606). On the other hand, if the time indicated by the timestamp is in the past ("YES" at 602), the fourth situation is handled in the same manner as the third situation (e.g., the flow continues to operation 603).

Maintaining User Tracking

In one aspect, the user's browsing activity is tracked by associating a tracking ID with the user. When an event is transmitted to the server, the incoming encrypted tracking ID is decrypted to reveal the tracking ID. In embodiments in which the N encrypted blobs are returned to the user, the server is able to determine if data loss has occurred by checking the received counter value. In situation where a user clears their cookies, the tracking system can still track the user using the encrypted IDs in their local storage.

By virtue of the tracking system discussed above, it is possible to deterministically link a user's identity across different subdomains by both setting a tracking cookie on the top level domain and maintaining the same tracking ID across multiple ciphertexts. With the cookie set on the top level domain all subdomains can read and modify the same cookie allowing a consistent value to be shared across subdomains and sent back to the server regardless of which subdomain the request originates. The cookie value is rotated to a new ciphertext which contains the same tracking ID. Consequently, the server can decrypt the ciphertext stored in the tracking cookie and retrieve a consistent tracking ID regardless of which subdomain sends the request.

Furthermore, by virtue of the tracking system discussed above, it is possible to reduce the overhead on advertising websites. For example, the operations of: generating a tracking ID if none exists for a domain, checking a timestamp whenever the client device sends a request to the server to determine whether or not to set a flag requesting a new ciphertext, setting a new cookie value when the server returns new ciphertext, and incrementing a failed requests counter in the event the request for a new ciphertext fails, introduce negligible overhead. Such operations also introduce no additional requests than if the JavaScript on the client device used a constant tracking value per domain in a cookie.

Additionally, by rotating the cookie value frequently in the manner described, it is difficult for an adversary (e.g., eavesdropper, attacker) to correlate the cookie value with a particular user or particular user interactions across multiple rotations. Also, the server does not introduce an oracle to correlate different cookie values. Finally, an attacker blocking cookie value rotation requests to the server will eventually see an uncorrelated cookie value as the client device will eventually generate a new tracking ID altogether.

State Properties

The following is an example listing of tracked state properties. The listing is not exhaustive and should not be considered limiting.

1. Tracking ID—the server uses the Tracking ID to correlate events coining from one browser across multiple subdomains.

2. Counter—the server uses the Counter to sequence requests. In the case that the server returns multiple ciphertexts the Counter is also used by the server to understand data loss.

3. Random Nonce—the server concatenates the Tracking ID with the Counter and the Random Nonce, encrypts the result and returns it to the client device, such that each ciphertext is unique and an attacker cannot track a user. For example, if an attacker sends the server an encrypted blob as described above, though the server will increment the counter and return a new blob, the new blob won't match a blob generated for genuine users because the Random Nonce will be different and will result in a different ciphertext.

4. Cookie Rotation Timestamp—this timestamp is a rough indication of how frequently to rotate the cookie value. In one aspect, the cookie rotation timestamp is located in plaintext in the cookie. In one aspect, the cookie rotation timestamp indicates that any event transmitted to the server after the time indicated in the timestamp should set a flag indicating that the client device wants a new encrypted blob to replace its cookie value. Alternatively, the JavaScript on the client device can also request rotating the cookie value with each event or upon page load. In one aspect, responsive to the JavaScript on the client device causing a new cookie value to be set, this timestamp is changed to a future time.

5. Failed Requests Counter—if the JavaScript on the client device attempts to rotate a cookie value but the event requests fail, this counter keeps track of how many events failed. If the Failed Requests Counter passes a certain threshold, the JavaScript on the client device causes the cookie to be destroyed. This prevents tracking of a user by an attacker who causes network failures whenever the JavaScript on the client device tries to rotate the cookie value. The Failed Request Counter is reset in response to the JavaScript on the client device successfully receiving and setting a new tracking cookie value from the server.

6. Failed Requests Timestamp—this timestamp indicates the last time the Failed Requests Counter was incremented. If another event request fails within a certain period of time of the last increment, the Failed Request Counter is not incremented. This acts as a form of rate limiting on the frequency at which the JavaScript on the client device should update the Failed Requests Counter to prevent the case where a large number of requests fail within a short period of time resulting in destruction of the tracking cookie. The Failed Requests Timestamp is reset in response to the client device successfully receiving and setting a new tracking cookie value from the server.

Security Properties

Several security and privacy properties of this first embodiment will now be discussed.

First, by virtue of the arrangement of the first embodiment, it is possible to minimize the possibility of an adversary (e.g., eavesdropper, attacker) tracking a user. In particular, the cookie value is the only means of tracking a user as it is the only persistent state between page requests and the only state sent over the network from the user to the advertising website. By rotating the cookie value to a seemingly random new value on a time interval, an eavesdropper cannot associate a cookie value before the rotation with a cookie value after the rotation. The eavesdropper therefore cannot track the user via a 1st party cookie across time intervals.

Second, by virtue of the arrangement of the first embodiment, it is difficult for an adversary to rebuild cookie sequencing—By encrypting the concatenation of the tracking ID with a random nonce an attacker cannot predict what the next cookie value, ciphertext, will be. If an attacker were to take a cookie value and submit it to the server to get the next cookie in the sequence, the server would generate a different ciphertext for the attacker because each ciphertext corresponds to a unique random nonce.

Third, by virtue of the arrangement of the first embodiment, it is difficult for an attacker to track a user by blocking cookie rotation requests, due to the failed requests counter. Should an attacker block requests from the client device to the server to prevent rotating the cookie value, the failed requests counter will increment. Once it has incremented beyond a certain threshold, the client device clears its own cookie and generates a new one. Consequently, an attacker who drops rotation requests will still see a new and uncorrelated cookie value making it impossible for an attacker to use that cookie to continue tracking the user.

Figure 9:
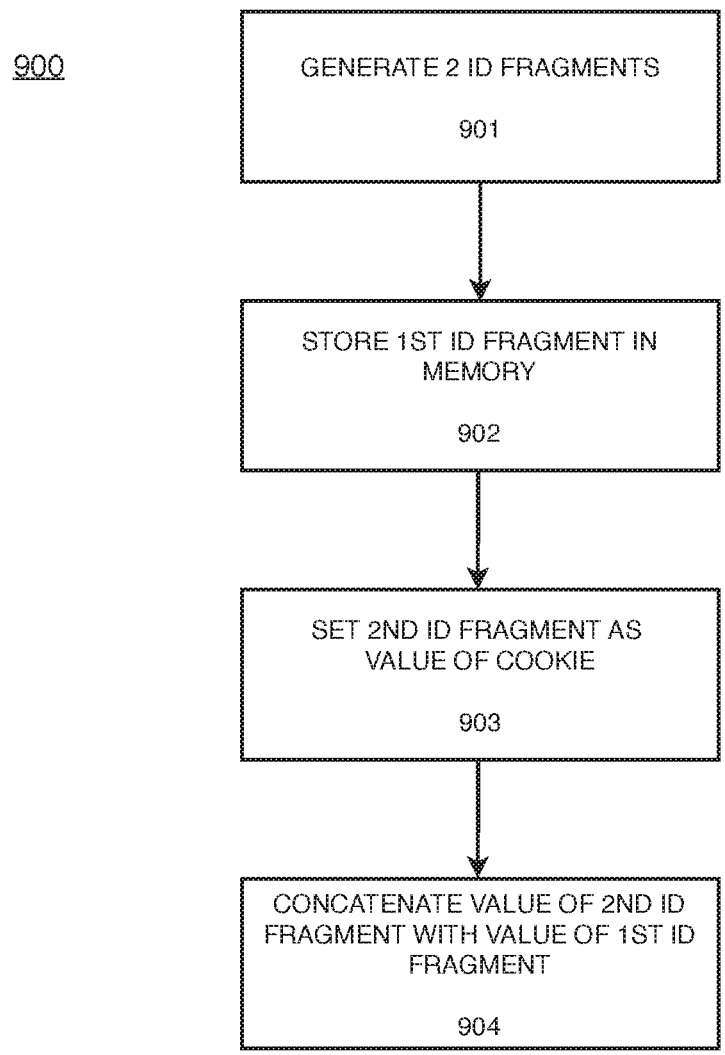
FIG. 9 is a flowchart illustrating operations of JavaScript running on an advertiser's website performing a method for tracking user browsing according to a second example embodiment.

A second embodiment will now be discussed in connection with the method 900 of FIG. 9, in which tracking IDs are generated by the client device (e.g., 102) rather than the server (e.g., 108). Similar to the first embodiment, the second embodiment also considers an adversary (e.g., potential attacker) that repeats messages either before a legitimate party sends them or in parallel (e.g., a "rushing" adversary). Also similar to the first embodiment, by virtue of the second embodiment, it is possible to minimize linkability of user browsing interactions over a defined period of time by the specified adversary.

Generally, according to the second embodiment, instead of receiving tracking IDs from the server, the client device generates random nonces which it uses as ID fragments. A tracking ID is generated by concatenating 2 ID fragments.

According to the second embodiment, in response to a user visiting a website for a first time (e.g., the page is loaded the for the first time), the client device generates 2 ID fragments (901). The first ID fragment is stored in memory (902). The second ID fragment is set as the value of an insecure cookie (903).

In a case where an event is transmitted to the server, the client device concatenates the value of the second ID fragment in the cookie with the value of the first ID fragment in memory (904).

In response to a new page being loaded, the cookie value is moved to memory and a new random ID fragment is generated and set as the insecure cookie's value.

If a page is loaded on a separate subdomain, the value of the site-wide insecure cookie is copied into memory and a new ID fragment is generated and set as the insecure cookie's value.

If a site is loaded with ID fragments in local storage but no cookie (due to the cookie being cleared) the first ID fragment from local storage is moved it into memory and the second ID fragment from local storage is set it as the value of the insecure cookie.

Maintaining User Tracking

Any tracking ID sent to the server is a concatenation of 2 ID fragments. By matching IDs that contain similar fragments, it is possible to determine which IDs correspond to which user. Because the IDs are generated in such a way that they chain together, only the head ID fragment in the chain (an ID fragment that doesn't match any tails) and a tail ID fragment (the second fragment in the most recent ID received) need to be maintained.

Surviving Cookie Clearing

In an optional aspect, user tracking can be maintained even in the case that the client device clears its cookies (so long as local storage is intact) by adding a third value in local storage. The value is moved from local storage into the cookie, the cookie value is moved into memory and a new value is generated in local storage on page load. A similar matching algorithm is employed, but by having the third value in local storage a common ID fragment would exist even if the user cleared their cookies.

Figure 10:
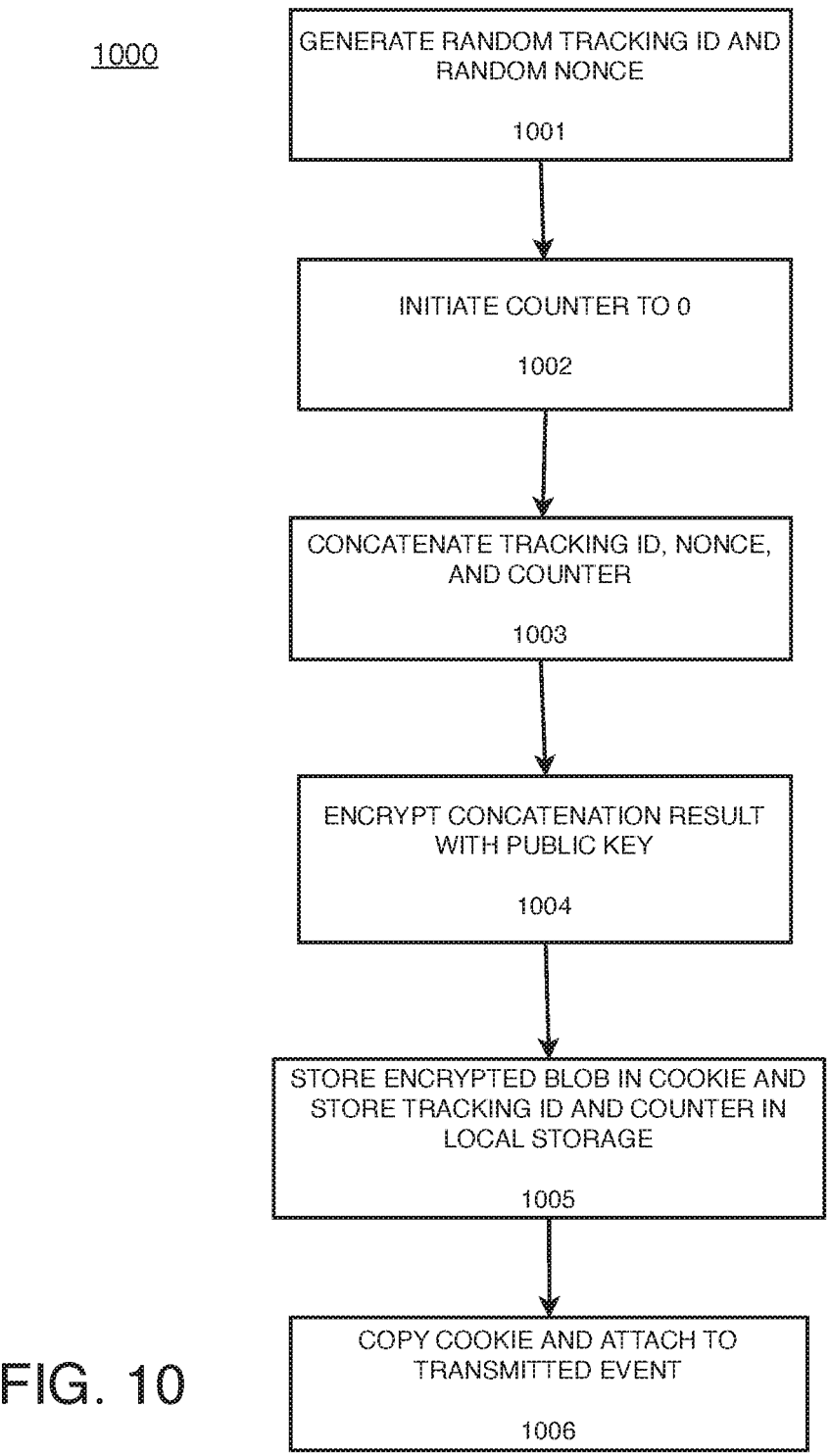
FIG. 10 is a flowchart illustrating operations of JavaScript running on an advertiser's website performing a method for tracking user browsing in a situation where it is a user's first time visiting a site according to a third example embodiment.
Figure 11:
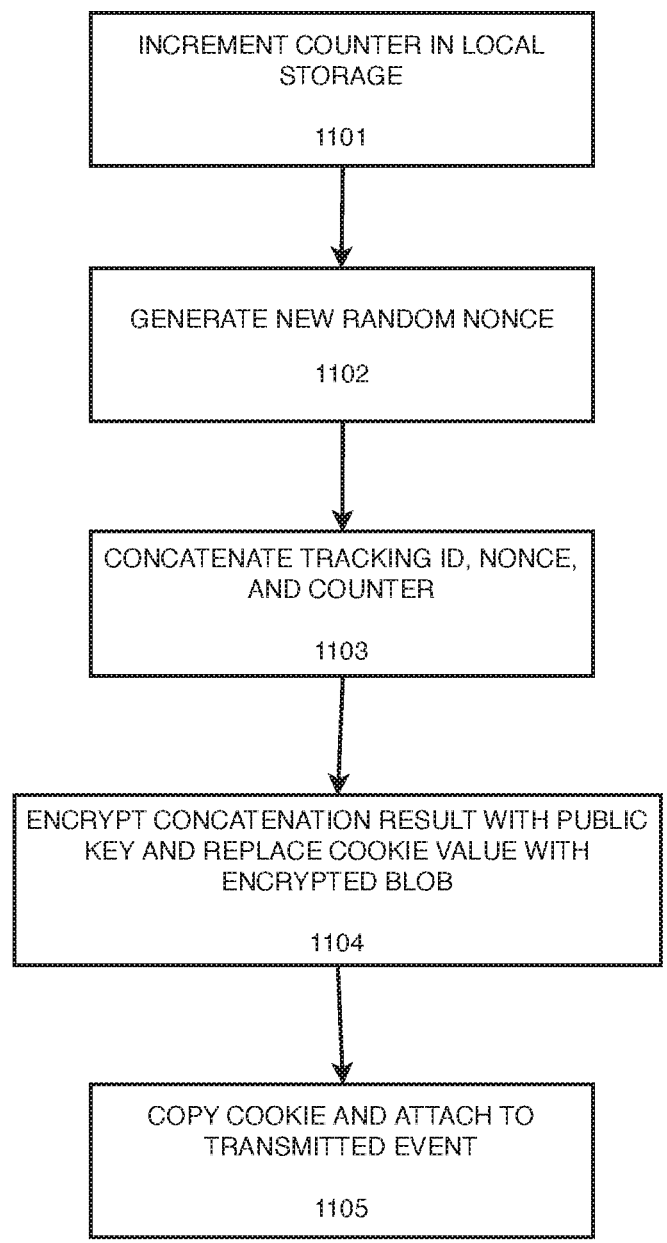
FIG. 11 is a flowchart illustrating operations of JavaScript running on an advertiser's website performing a method for tracking user browsing in a situation where it is a user's second time visiting a site according to a third example embodiment.
Figure 12:
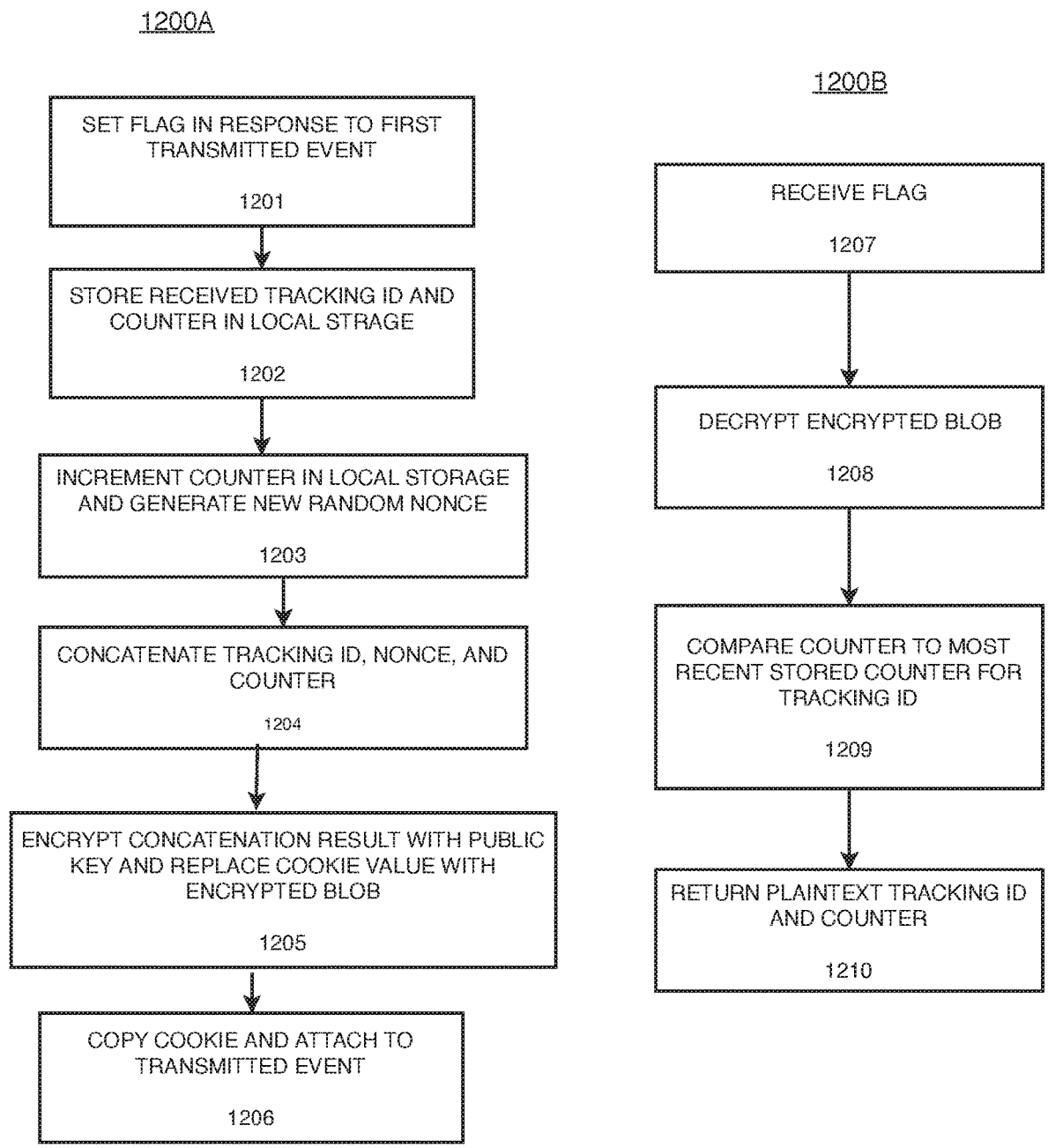
FIG. 12 depicts flowcharts illustrating (i) operations of JavaScript running on an advertiser's website performing a method for tracking user browsing in a situation where a user visits a site (e.g., subdomain) related to a site already viewed, and illustrating (ii) operations of a tracking system, according to a third example embodiment.

A third embodiment will now be discussed in connection with FIGS. 10-12, in which tracking IDs are generated by the client device (e.g., 102) using a public key. Here, a weaker adversary than that of the first and second embodiments are considered, namely a passive network attacker who has full visibility of the network and can make network requests, but not in real time or in any kind of race against users' legitimate requests to the server.

Generally, according to the third embodiment, a public key is added in the JavaScript running on the client device and the client device generates its own tracking ID. The client device increments its counter. Both the tracking ID and the counter are encrypted and stored in an insecure cookie. This allows the client device to update its cookie value without depending on the server. The server has the corresponding private key and is able to decrypt the user ID and counter received from the client device. Additionally, the server provides an endpoint which decrypts an encrypted blob and returns the plaintext tracking ID and counter if the counter value is greater or equal to the latest counter value seen by the server. By virtue of the third embodiment, it is possible to provide tracking while maintaining unlinkability of user interactions over a defined period of time against the specified adversary.

In the context of the third embodiment, there are 3 situations to consider.

The first situation is discussed in connection with method 1000 of FIG. 10. The first situation considers a user's first time viewing a site. In response to a user viewing a site, the JavaScript running on the advertising website checks for the existence of an insecure cookie. Since in the first situation it is a user's first time viewing a site, the insecure cookie does not exist. The JavaScript then checks local storage for a tracking ID and a counter. In this first situation where it is a user's first time visiting a site, the tracking ID and the counter don't exist. A random tracking ID and a random nonce are generated (1001), and a counter is initiated to 0 (1002). The tracking ID, nonce, and counter are concatenated (1003) and the result is encrypted with the public key in the JavaScript (1004). The encrypted blob is stored in an insecure cookie and the tracking id and counter are stored in local storage (1005). In response to an event being transmitted to the server, the cookie value is copied and attached to the event (1006). In one aspect, the server receives and decrypts the encrypted blob with the associated private key that it maintains. The server then recovers the tracking ID.

The second situation is discussed in connection with method 1100 of FIG. 11. In the second situation, it is a user's second time viewing a site. Here, in response to a user viewing a site, the JavaScript running on the advertising website checks for the existence of an insecure cookie. Since in the second situation it is a user's second time viewing a site, the insecure cookie does exist. It is then determined whether a tracking ID and a counter have been stored in local storage. Since in this second situation it is the user's second time viewing the site, the tracking ID and the counter exist. The counter in local storage is incremented (1101) and a new random nonce is generated (1102). The tracking ID, nonce, and counter are concatenated (1103). The result is encrypted with the public key in the JavaScript and the cookie value is replaced with the new encrypted blob (1104). In response to an event being transmitted to the server, the cookie value is copied and attached it to the event (1105).

The third situation is discussed in connection with methods 1200A and 1200B of FIG. 12. In the third situation, the user views a subdomain of the website for the first time. In response to a user viewing a site, the JavaScript running on the advertising website checks for the existence of an insecure cookie. Since in the third situation the user has visited a website related to the subdomain, the insecure cookie does exist. The JavaScript then checks local storage for a tracking ID and a counter. In this third situation, they don't exist. A flag on the encrypted blob is set on the first event transmitted to the server (1201). In response to the server receiving the flag (1207), the server decrypts the encrypted blob (1208) and compares the counter against the latest counter it has stored for that tracking ID (1209). If the submitted counter is greater or equal to the latest counter, the server returns the plaintext tracking ID and counter from the encrypted blob (1210). The tracking ID and the counter are stored in local storage (1202). The counter in local storage is incremented and a new random nonce is generated (1203). The tracking ID, nonce, and counter are concatenated (1204). The result of the concatenation is encrypted with the public key in the JavaScript and the cookie value is replaced with the new encrypted blob (1205). In response to an event being transmitted to the server, the cookie value is copied and attached to the event (1206).

Maintaining User Tracking

In the third embodiment, the user is tracked by associating a tracking ID with the user. When an event is transmitted to the server, the incoming encrypted blob is decrypted to reveal the tracking ID. By checking the received counters, it is possible to determine if there is data loss (e.g., if counters are be missing it is considered that there is data loss).

Even if a user clears cookies on the client device, the user can still be tracked as their tracking ID and counter are stored in their local storage.

Software Architecture

Figure 13:
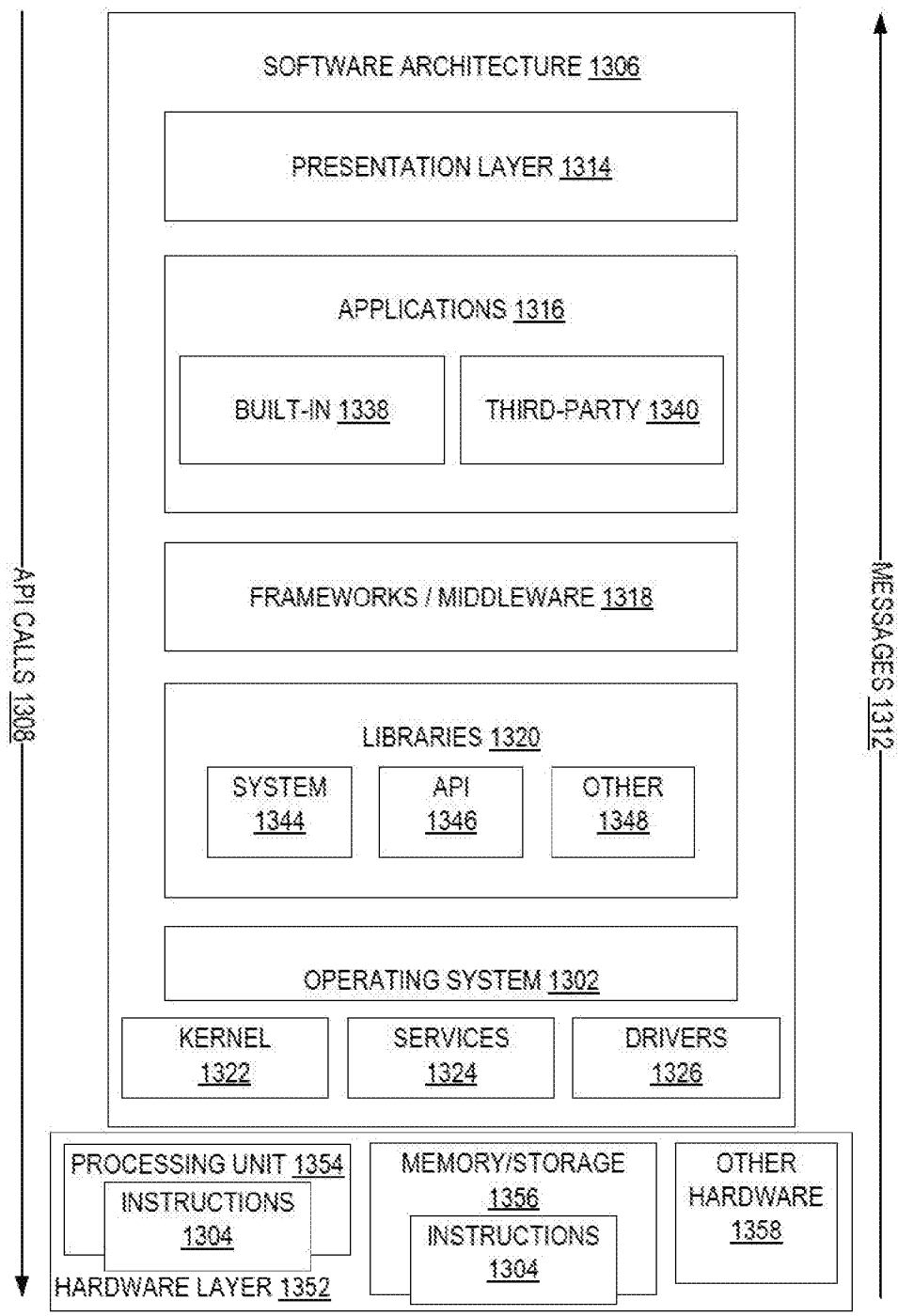
FIG. 13 is a block diagram illustrating a representative software architecture, which may be used in conjunction with various hardware architectures herein described and used to implement various embodiments.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as machine 1400 of FIG. 14 that includes, among other things, processors 1434, memory 1414, and I/O components 1418. A representative hardware layer 1352 is illustrated and can represent, for example, the machine 1400 of FIG. 41. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316 and a presentation layer 1314. Operationally, the applications 1316 and/or other components within the layers may invoke application programming interface (API) API calls 1308 through the software stack and receive a response as in response to the API calls 1008. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324 and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
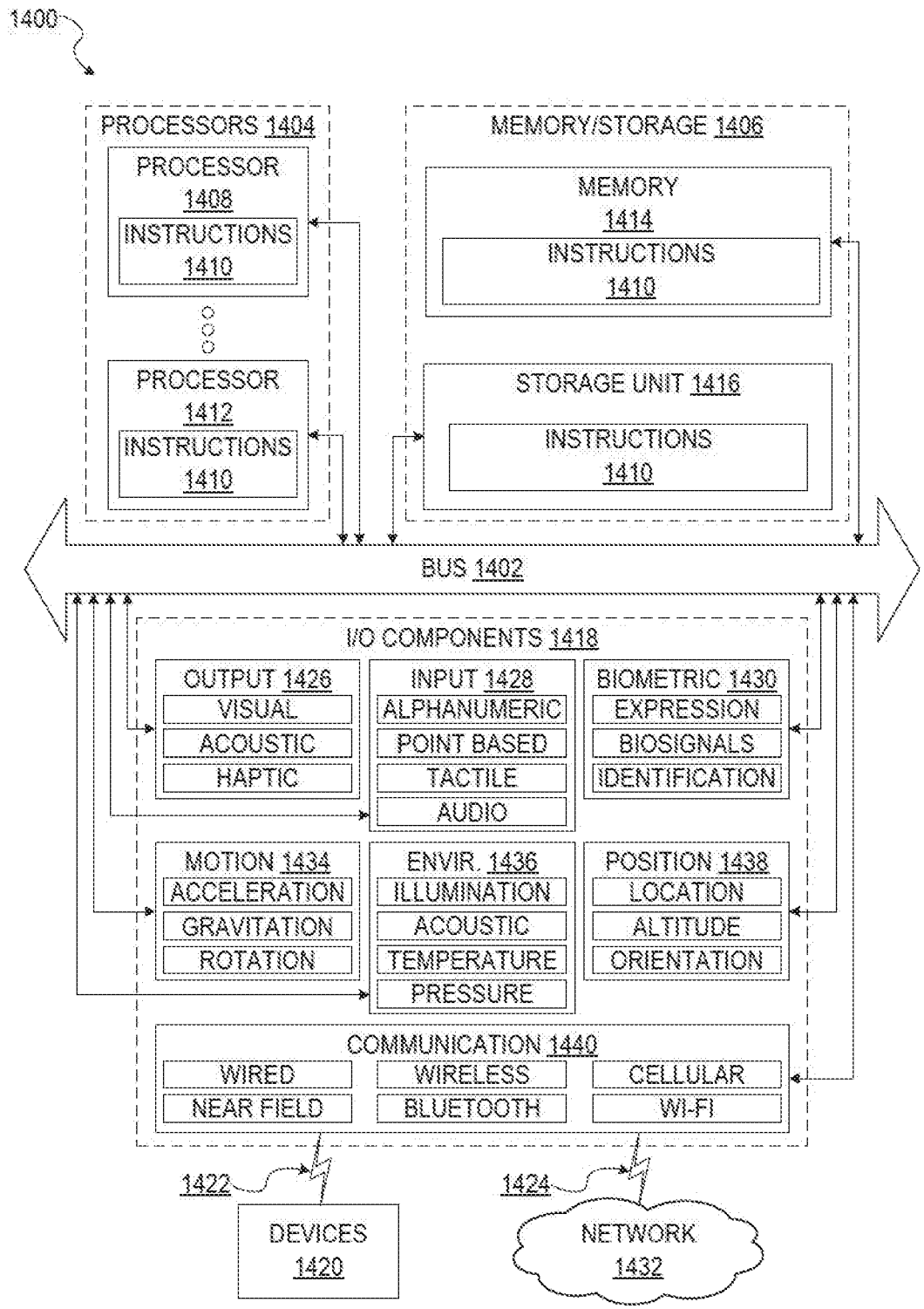
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental environment components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1422 and coupling 1424 respectively. For example, the communication components 1440 may include a network interface component or other suitable device to interface with the network 1432. In further examples, communication components 1440 may include wired communication components, wireless communication components, cellular communication components, Near Field Communication (NEC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively, different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (APO). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced. Instruction Set Computing (RISC) processor, a Complex instruction Set Computing (CISC) processor, a Graphics Processing Unit (CPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

What is claimed is:

1. A method comprising:
   determining whether a cookie is stored in local storage of a client device;
   in response to determining that the cookie is not stored:
      generating a tracking identification (ID);
      storing the tracking ID, a cookie rotation timestamp, and a failed request counter in a generated cookie; and
      copying the generated cookie and attaching the generated cookie to a transmitted event;
   in response to determining that the cookie is stored:
      determining whether a time indicated by a stored cookie rotation timestamp is in the past;
      in response to determining that the time is in the past, setting a flag requesting a new cookie value for a transmitted event; and
      in response to determining that the time is not in the past, copying the stored cookie and attaching the stored cookie to a transmitted event,
   incrementing the failed request counter in response to each failed request for the new cookie value;
   in response to determining that the failed request counter exceeds a threshold:
      deleting the cookie from the local storage,
      receiving a preset number of encrypted blobs, caching the encrypted blobs in the local storage, and using at least one of the encrypted blobs to replace a current cookie value, each encrypted blob decrypting to a tracking ID concatenated with a counter and a random nonce, and
      pairing the failed request counter with a failed request timestamp indicating a last time the failed request counter was incremented, to limit a frequency at which the failed request counter is updated.

2. The method of claim 1, wherein a transmitted event includes at least one of: a purchase made via a website or mobile site and user sign-up via a website or mobile site.

3. The method of claim 1, wherein the cookie rotation timestamp is rounded to a predefined level of specificity, to prevent user tracking based on timestamps that are more granular than the predefined level of specificity.

4. The method of claim 1, wherein the cookie rotation timestamp is incremented in response to receiving the new cookie value.

5. The method of claim 1, wherein the counter is incremented in response to the replacement of the current cookie value.

6. The method of claim 1, wherein each encrypted blob corresponds to encrypting a result of concatenating the tracking ID, counter, and random nonce.

7. The method of claim 1, wherein the stored cookie is set at a top-level domain, is configured to be readable and modifiable by plural subdomains of the top-level domain, and is configured to maintain the tracking ID when rotating to a new ciphertext, such that the new ciphertext provides a consistent value when retrieving the tracking ID regardless of a requesting subdomain of the plural subdomains.

8. The method of claim 1, wherein determining that the cookie is not stored corresponds with a user's first time viewing a website.

9. The method of claim 1, wherein determining that the cookie is stored and determining that the time is not in the past corresponds with a user revisiting a website and the cookie rotation timestamp being valid.

10. The method of claim 1, wherein determining that the cookie is stored and determining that the time is in the past corresponds with a user revisiting a website and the cookie rotation timestamp being invalid.

11. The method of claim 1, wherein setting the flag in response to determining that the time is in the past, and copying the stored cookie and attaching the stored cookie in response to determining that the time is not in the past, is performed with respect to a user revisiting a website on a different subdomain.

12. A system comprising:
one or more processors of a client device; and
a memory storing instructions that, when executed by the one or more processors, cause the system to perform operations comprising:
determining whether a cookie is stored in local storage of a client device;
in response to determining that the cookie is not stored:
generating a tracking identification (ID);
storing the tracking ID, a cookie rotation timestamp, and a failed request counter in a generated cookie; and
copying the generated cookie and attaching the generated cookie to a transmitted event;
in response to determining that the cookie is stored:
determining whether a time indicated by a stored cookie rotation timestamp is in the past;
in response to determining that the time is in the past, setting a flag requesting a new cookie value for a transmitted event; and
in response to determining that the time is not in the past, copying the stored cookie and attaching the stored cookie to a transmitted event,
incrementing the failed request counter in response to each failed request for the new cookie value;
in response to determining that the failed request counter exceeds a threshold:
deleting the cookie from the local storage,
receiving a preset number of encrypted blobs, caching the encrypted blobs in the local storage, and using at least one of the encrypted blobs to replace a current cookie value, each encrypted blob decrypting to a tracking ID concatenated with a counter and a random nonce, and
pairing the failed request counter with a failed request timestamp indicating a last time the failed request counter was incremented, to limit a frequency at which the failed request counter is updated.

13. The system of claim 12, wherein a transmitted event includes at least one of: a purchase made via a website or mobile site and user sign-up via a website or mobile site.

14. The system of claim 12, wherein the cookie rotation timestamp is rounded to a predefined level of specificity, to prevent user tracking based on timestamps that are more granular than the predefined level of specificity.

15. The system of claim 12, wherein the cookie rotation timestamp is incremented in response to receiving the new cookie value.

16. The system of claim 12, wherein the counter is incremented in response to the replacement of the current cookie value.

17. A non-transitory computer-readable medium comprising instructions, which when executed by a computing device, cause the computing device to perform operations comprising:
determining whether a cookie is stored in local storage of a client device;
in response to determining that the cookie is not stored:
generating a tracking identification (ID);
storing the tracking ID, a cookie rotation timestamp, and a failed request counter in a generated cookie; and
copying the generated cookie and attaching the generated cookie to a transmitted event;
in response to determining that the cookie is stored:
determining whether a time indicated by a stored cookie rotation timestamp is in the past;
in response to determining that the time is in the past, setting a flag requesting a new cookie value for a transmitted event; and
in response to determining that the time is not in the past, copying the stored cookie and attaching the stored cookie to a transmitted event,
incrementing the failed request counter in response to each failed request for the new cookie value;
in response to determining that the failed request counter exceeds a threshold:
deleting the cookie from the local storage,
receiving a preset number of encrypted blobs, caching the encrypted blobs in the local storage, and using at least one of the encrypted blobs to replace a current cookie value, each encrypted blob decrypting to a tracking ID concatenated with a counter and a random nonce, and
pairing the failed request counter with a failed request timestamp indicating a last time the failed request counter was incremented, to limit a frequency at which the failed request counter is updated.

* * * * *